United States Patent
Bull et al.

(10) Patent No.: US 8,138,975 B2
(45) Date of Patent: Mar. 20, 2012

(54) INTERFERENCE DETECTION, CHARACTERIZATION AND LOCATION IN A WIRELESS COMMUNICATIONS OR BROADCAST SYSTEM

(75) Inventors: Jeffrey F. Bull, Chalfont, PA (US); Matthew L. Ward, Collegeville, PA (US)

(73) Assignee: TruePosition, Inc., Berwyn, PA (US)

( * ) Notice: Subject to any disclaimer, the term of this patent is extended or adjusted under 35 U.S.C. 154(b) by 546 days.

(21) Appl. No.: 12/346,598

(22) Filed: Dec. 30, 2008

(65) Prior Publication Data
US 2012/0032854 A1    Feb. 9, 2012

(51) Int. Cl.
*G01S 3/02* (2006.01)
*G01S 19/42* (2010.01)

(52) U.S. Cl. .................... 342/450; 342/357.25; 342/465

(58) Field of Classification Search ............. 342/357.25, 342/357.47, 437, 442, 450, 457, 465
See application file for complete search history.

(56) References Cited

U.S. PATENT DOCUMENTS

| | | | |
|---|---|---|---|
| 4,728,959 A | 3/1988 | Maloney et al. |
| 5,327,144 A | 7/1994 | Stilp et al. |
| 5,510,801 A | 4/1996 | Engelbrecht et al. |
| 5,828,336 A | 10/1998 | Yunck et al. |
| 5,936,571 A | 8/1999 | Desjardins |
| 6,047,192 A | 4/2000 | Maloney et al. |
| 6,108,555 A | 8/2000 | Maloney et al. |
| 6,119,013 A | 9/2000 | Maloney et al. |
| 6,351,235 B1 | 2/2002 | Stilp |
| 6,559,800 B2 | 5/2003 | Rabinowitz et al. |
| 6,876,859 B2 | 4/2005 | Anderson et al. |
| 6,879,286 B2 | 4/2005 | Rabinowitz et al. |
| 6,917,328 B2 | 7/2005 | Rabinowitz et al. |
| 7,026,987 B2 | 4/2006 | Lokshin et al. |
| 7,345,627 B2 | 3/2008 | Zimmerman et al. |
| 7,388,541 B1 | 6/2008 | Yang |
| 7,471,236 B1 | 12/2008 | Pitt et al. |
| 7,551,126 B2 | 6/2009 | Loomis et al. |
| 2007/0085732 A1 | 4/2007 | Van Diggelen |
| 2007/0161385 A1 | 7/2007 | Anderson |
| 2007/0257831 A1 | 11/2007 | Mathews et al. |
| 2008/0220749 A1 | 9/2008 | Pridmore et al. |
| 2009/0092114 A1 | 4/2009 | Feher |
| 2009/0143018 A1 | 6/2009 | Anderson et al. |

FOREIGN PATENT DOCUMENTS

EP       1051053       11/2000

OTHER PUBLICATIONS

Drucker, E., "On the same day that U.S. citizens elected a new president, the FCC voted in "white spaces"," Wireless Week, Dec. 1, 2008, 1 page.

(Continued)

*Primary Examiner* — Dao Phan
(74) *Attorney, Agent, or Firm* — Woodcock Washburn LLP

(57) ABSTRACT

A Wide Area Sensor Network (WASN) is disclosed that utilizes wideband software defined radios (SDRs) to monitor RF energy over a wide frequency range, detect when critical frequencies are being jammed or otherwise interfered with, and locate the source of the interference so that the interference can be eliminated. The WASN may use one or more geolocation techniques In addition, the WASN may detect and locate unauthorized transmitters as well as estimate the transmitted power of authorized transmitters to assure they are not transmitting more power than authorized.

102 Claims, 11 Drawing Sheets

OTHER PUBLICATIONS

Allen, M., "TeleCommunication Systems, Inc. Awarded U.S. Patent for Cellular-Augmented Radar and Laser Detection Technology," Press Release, TeleCommunication System, Inc., Dec. 30, 2008, p. 1-3.

U.S. Appl. No. 12/509,391, filed Jul. 24, 2009, Bull et al.

PCT Application No. PCT/US2010/037709: International Search Report and Written Opinion dated Aug. 10, 2010.

Last, D., "Expert Advice: GPS Forensics, Crime, and Jamming," *GPS World*, Oct. 4, 2009, 4 pgs.; downloaded from http://www.gpsworld.com/.

PCT Application No. PCT/US2009/067772: International Search Report and Written Opinion dated Feb. 25, 2010.

Scott, "J911: Fast Jammer Detection and Location Using Cell-Phone Crowd-Sourcings", GPS World, Nov. 2010, 32-36.

FCC-White Space Opinion and Order, FCC-10-174A1, issued Sep. 23, 2010, 88 pages.

INTERFERENCE DETECTION, CHARACTERIZATION AND LOCATION IN A WIRELESS COMMUNICATIONS OR BROADCAST SYSTEM

TECHNICAL FIELD

The present invention generally relates to the detection and location of interfering transmitters within the geographic coverage area of a wireless communications and broadcast networks and, in particular, to the location and detection of such interferers using a network-based wireless location system.

BACKGROUND OF THE INVENTION

The characterization of a radio signal in the presence of noise is a classic radio problem. Commonly called "co-channel" or "adjacent channel" interference, spurious signals are considered part of the radio noise that a receiver must deal with in the course of normal operation.

As the use of wireless communications has increased from traditional radio and television broadcasts to two-way terrestrial and satellite wireless communications, the value of radio transmissions has increased. And as the value of radio transmissions has increased, the problem of intentional interference, such as denial of service attacks, have also increased.

Detection of an interfering radio signal and characterization of the interfering signal is well known in the art. Geolocation techniques have been created suitable to wide area deployment, mostly under the auspices of the United States (US) Federal Communications Commission (FCC) Enhanced 9-1-1 mandate. For example, several experiments were conducted during several months of 1995 and 1996 in the cities of Philadelphia and Baltimore to verify the system's ability to mitigate multipath in large urban environments. In 1996, TruePosition constructed the first commercial system in Houston, Tex. that was used to test the technology's effectiveness in that area and its ability to interface directly with E9-1-1 systems. In 1997, the location system was tested in a 350 square mile area in the State of New Jersey and was used to locate real 9-1-1 calls from real people in trouble.

The following is an overview of the network-based geolocation techniques most applicable to locating generic interfering radio signals over a wide area.

Geolocation Techniques

Geolocation is the process of determining the source of a radio frequency (RF) signal by exploiting the characteristics of radio wave propagation. As radio waves propagate from their point of origin, the waves emanate as spherical waves in all directions. The waves exhibit a time delay because they travel at a fixed speed and with an apparent reduction in power because of spherical spreading. Thus, at a point of reception that is fixed with respect to a fixed point of origin, an RF signal appears to originate from a specific direction, exhibit a time delay that is proportional to the distance between the point of origin and point of reception, and reduced in power by an amount proportional to the distance between the point of origin and point of reception.

Geolocation techniques that exploit time delays are known as Time-of-Arrival (TOA) and Time-Difference-of-Arrival (TDOA) techniques. Geolocation techniques that exploit the change in power radio wave characteristics as they propagate are know as Power-of-Arrival (POA) and Power-Difference-of-Arrival (PDOA) techniques. Angle-of-Arrival (AoA) geolocation techniques measure the direction from which a source of RF appears to originate. Radio waves also experience an apparent change in frequency as a result of the Doppler effect when the source is moving or the sensor receiving the source is moving. The amount of frequency shift is dependent upon the center frequency of the source as well as the relative velocity between the source and receiving sensor. Geolocation techniques that exploit this characteristic of RF signal propagation are known as Frequency-Difference-of-Arrival (FDOA) techniques.

Each geolocation technique provides different levels of performance in terms of location accuracy and impose different requirements on the sensors (i.e. software defined radios (SDRs)) in a Wide Area Sensor Network (WASN). A key benefit of the WASN is a sensor platform that is calibrated in power and synchronized in time and frequency to permit the exploitation of all of the characteristics of radio wave propagation to determine the origins of RF signals. The multichannel RF to IF stage of the SDR permits the SDR to utilize a direction finding antenna array to determine the AoA of incident RF energy. Each approach can be utilized separately or combined with other techniques, i.e. hybrid geolocation.

Time-of-Arrival (TOA) Based Geolocation:

Network-based TOA location uses the relative time of arrival of a radio broadcast at the network-based receivers. This technique requires that the distance between individual receiver sites (SDRs) and any differences in individual receiver timing be known (cabling delays, differences in SDR designs or hardware revisions). The radio signal time-of-arrival can then be normalized at the receiver site, leaving only the time-of-flight between the device and each receiver. Since radio signals travel with a known velocity, the distance can be calculated from derived, normalized time-of-arrivals at the receivers. Time-of-arrival data collected from three of more receivers may be used to resolve the precise position.

Time-Difference-of-Arrival (TDOA) Based Geolocation:

TDOA is the most accurate and useful time-based geolocation technique for emitters that are not cooperative. TDOA requires close time synchronization between the SDRs in the WASN. When two sensors receive a RF signal simultaneously and the time delay between these two received signals is determined, it is well known that a hyperbola, with the two sensors at its foci, describes the potential locations of the originating signal. Adding a third sensor, again time synchronized with the other two and receiving the same signal simultaneously, provides another hyperbola. The intersection of these two hyperbola reveals a unique location as the source of the RF energy. Adding even more sensors yields a greater location accuracy with an overdetermined solution. TDOA location accuracy depends upon the bandwidth of the signal being located as well as a number of other factors such as integration time and signal-to-noise ratio. Additional detail on using TDOA to locate transmitters (e.g., mobile phones) can be found in commonly assigned U.S. Pat. No. 5,327,144—"Cellular telephone location system" and U.S. Pat. No. 6,047,192—"Robust, efficient, localization system."

Additional details on using TDOA hybrids to locate transmitters (e.g., mobile phones) can be found in commonly assigned U.S. Pat. No. 6,108,555—"Enhanced time difference localization system" and U.S. Pat. No. 6,119,013—"Enhanced time-difference localization system."

Angle-of-Arrival (AoA) Based Geolocation:

The SDRs of the WASN possess multichannel phase and frequency coherent circuitry, permitting the use of phase interferometric antenna arrays to be used to determine the angle-of-arrival (AoA) of RF signals. In effect, the AoA points to the direction from which the RF energy originated. A unique location can be estimated by determining the AoA at two or more geometrically separated sites. The unique location is represented by the intersection of the two or more lines of bearing. AoA does not require fine time or frequency synchronization between the sites and providing AoA information to the system controller/central processor. Furthermore, AoA accuracy is not dependent upon the bandwidth of the emitter as with UTDOA, providing the capability to geolocate on narrowband signals. Additional detail on using AoA to locate transmitters (mobile phones) can be found in commonly assigned U.S. Pat. No. 4,728,959—"Direction finding localization system." Additional detail on using AoA/TDOA hybrids to locate transmitters (mobile phones) can be found in commonly assigned U.S. Pat. No. 6,119,013—"Enhanced time-difference localization system."

Power-of-Arrival (POA) and Power-Difference-of-Arrival (PDOA) Based Geolocation:

An approximate location of an emitter may be determined by measuring its power at various locations. Measurement can be performed simultaneously with multiple sensors or in a time multiplexed fashion by moving a single sensor to several locations for emitters that transmit a constant power for a significant length of time. Power based geolocation techniques do not have as stringent time and frequency synchronization requirements as the other geolocation techniques discussed above. However, fast fading and shadow fading may limit the accuracy of this method.

Since the power of a radio signal decreases with range as a result of attenuation of radio waves by the atmosphere and the combined effects of free space loss, plane earth loss, and diffraction losses, an estimate of the range can be determined from the received signal. In simplest terms, as the distance between transmitter and receiver increases, the radiated radio energy is modeled as if spread over the surface of a sphere. This spherical model means that the radio power at the receiver is decreased by the square of the distance.

POA

Power of arrival is a proximity measurement used between a single network node (the SDR) and transmitter. POA location uses the relative power of arrival of a radio broadcast at the network-based SDRs.

Using signal propagation modeling and historical calibration data, the radio signal power-of-arrival can be normalized at the receiver site, leaving only the path-loss between the device and each receiver. Power-of-arrival data collected from three or more receivers can be used to resolve an approximate position.

PDOA

PDOA uses the absolute differences in received radio power at multiple receivers to compute a position. PDOA location techniques require that receiver locations be known a priori. Signal propagation modeling and/or historical calibration data can be used to improve the location estimate. Power data collected from three of more receivers using a common time-base can be used to resolve an approximate position.

Frequency-Difference-of-Arrival (FDOA)

Using FDOA to determine an approximate location of an emitter is performed by measuring the signal's frequency at various locations. Measurement is performed simultaneously with multiple sensors or in a time multiplexed fashion by moving a single sensor to several locations for emitters that transmit for a significant length of time.

Frequency-Difference-of-Arrival uses measurement of signal frequency offsets as received at multiple receivers. Due to the differing Doppler-induced frequency offsets, FDOA provides speed and heading of moving transmitters. To use FDOA for location estimation, either or both the transmitter or receiver(s) must be in motion.

Since both the FDOA and TDOA techniques require a precise timing source (common clock and a common frequency reference), both techniques can be used simultaneously for localization as described in commonly assigned U.S. Pat. No. 6,876,859—"Method for estimating TDOA and FDOA in a wireless location system."

Hybrid Geolocation Techniques:

All the described location techniques can be used for the localization of an emitter by using techniques such as a Weighted Least Squares or Constrained Least Squares algorithm which allows the additive probability of each location technique to render a best location estimate for the technique or mix of techniques used.

The great dependence of a modern society's upon wireless systems creates vulnerabilities to disruption of the wireless systems. Wireless equipment is relatively unprotected to disruption by jamming and interference whether inadvertent or intentional. A system that is capable of being deployed over a wide area that detects, classifies and locates wireless signals would be useful for monitoring the airwaves for interference to critical wireless signals. It would be advantageous to use one or more of the above geolocation techniques in a Wide Area Sensor Network (WASN) to identify and locate intentional and unintentional sources of interference over a geographic area of interest.

SUMMARY OF THE INVENTION

The following summary provides an overview of various aspects of exemplary embodiments of the present disclosure. This summary is not intended to provide an exhaustive description of all of the important aspects of the disclosed subject matter, or to define the scope of the disclosure. Rather, this summary is intended to serve as an introduction to the following description of illustrative embodiments.

A Wide Area Sensor Network (WASN) is disclosed that utilizes wideband software defined radios (SDRs) to provide a capability to monitor the airwaves over a wide frequency range, detect when critical frequencies are being jammed or otherwise interfered with, and locate the source of the interference so that the interference can be eliminated. The WASN may use one or more of the above described geolocation techniques In addition, the WASN may detect and locate unauthorized transmitters as well as estimate the transmitted power of authorized transmitters to assure they are not transmitting more power than authorized.

In an exemplary embodiment, methods and systems for detecting, classifying and locating radio frequency (RF) emitters in a wide area wireless communications network is disclosed. In one embodiment, a method may comprise receiving information for at least one signal to be monitored, capturing time domain data for the signal for a predetermined duration over a predetermined bandwidth, dividing the predetermined duration into equal time intervals and associating the time domain data with the equal time intervals, converting the time domain data into frequency domain data and converting each of the time intervals into a frequency bin, determining power characteristics for each of the frequency bins, applying a spectral mask for the signal, determining that a source of interference is present when the power characteristic for the frequency bin substantially differs from the power characteristic of the spectral mask; and locating the source of interference using a geolocation determination algorithm.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
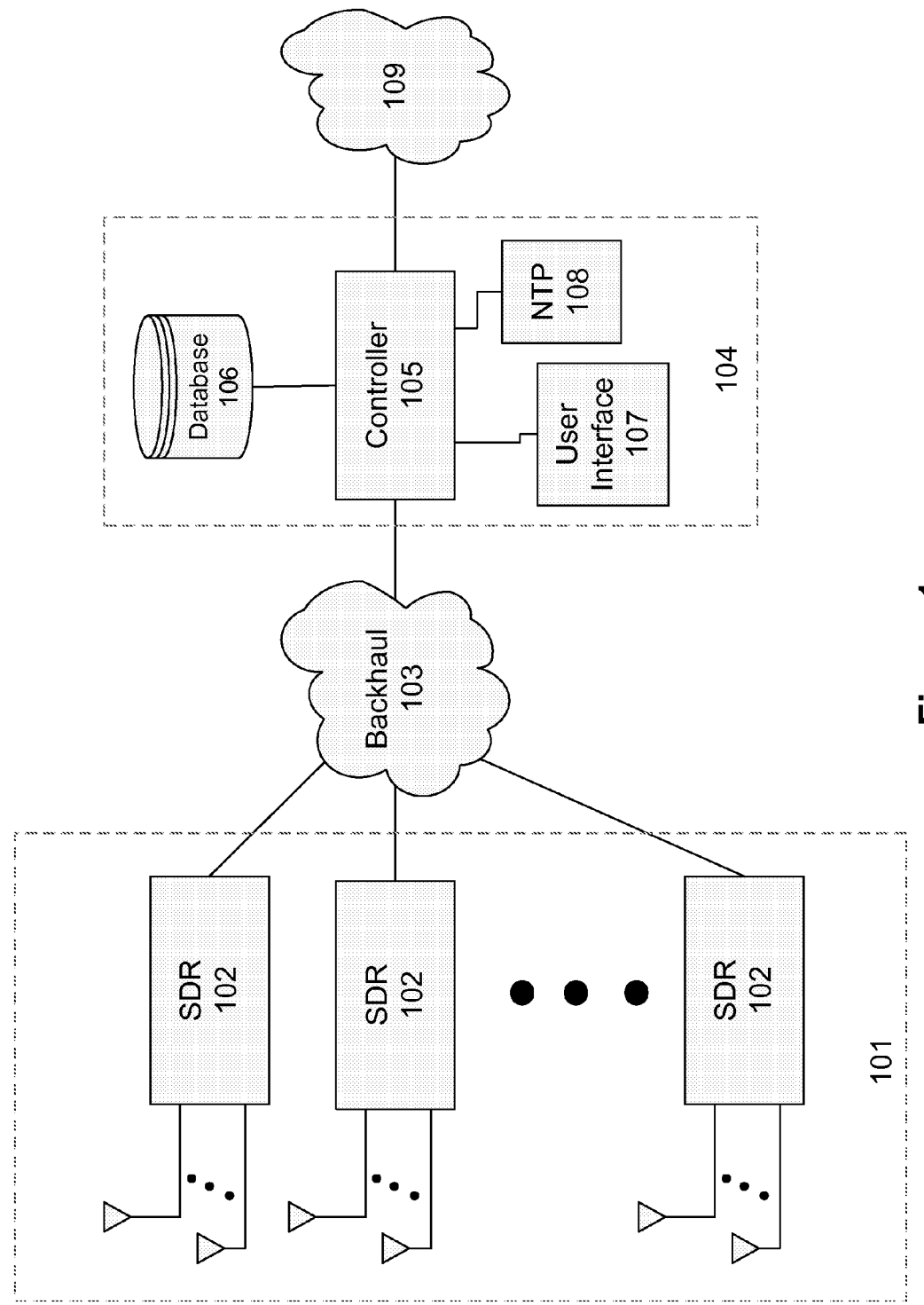
FIG. 1 schematically depicts the major functional nodes of the Wide Area Sensor Network (WASN).

Certain specific details are set forth in the following description and figures to provide a thorough understanding of various embodiments of the invention. Certain well-known details often associated with signal processing, computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

We will now describe illustrative embodiments of the present invention. First, we provide a detailed overview of the problem and then a more detailed description of our solutions.

Wireless systems abound in many areas of the world. Every aspect of our modern life is significantly influenced by wireless technology. Whether it is the "anytime, anywhere" convenience of mobile phones or the entertainment provided by satellite television, wireless technology greatly impacts a modern society's productivity and well being. Recently, much of modern society's critical infrastructure has become dependent upon satellite navigation systems. Satellite navigation systems are used to determine the whereabouts of critical assets, assist in aircraft navigation including takeoffs and landings from airports and provide timing information for our telecommunications infrastructure. The great dependence of a modern society's upon wireless systems creates vulnerabilities to disruption of the wireless systems.

Wireless equipment is relatively unprotected to disruption by jamming and interference whether inadvertent or intentional. A system that is capable of being deployed over a wide area that detects, classifies and locates wireless signals would be useful for monitoring the airwaves for interference to critical wireless signals. Additionally, such a system could be used as a tool for many other purposes including optimization of the quality of wireless service. The system could use any of a number of well-known network-based location geolocation techniques to estimate the position of the emitter of interest.

Furthermore, such a system can determine the effective utilization of RF channels by measuring RF power versus frequency and time. With the upcoming switch to a digital TV format for over-the-air (OTA) TV, such a capability may also permit the determination of where unlicensed "white space" transmitters can be located as well as how much power they can transmit without interfering with digital OTA TV service.

A Wide Area Sensor Network (WASN) may be a passive receiving system with the capability to detect and locate jamming and interference to critical wireless signals over a wide frequency band and large geographic area. An exemplary WASN is illustrated in FIG. 1. The WASN is comprised of a network of software defined radios (SDRs) 102 capable of a wide instantaneous bandwidth, a system controller/central processor 105 and a backhaul communications network 103 interconnecting the system controller/central processor 105 with the SDRs 102. Additionally, a database 106 may be a component of the system and connected to the controller/central processor 105 as well as one or more user interface terminals 107. The WASN may utilize the database 106 for storage of allowed transmitter characteristics and for archiving the results of various campaigns. The database 106 may also be used for map storage with multiple layers of geographic, topographic, radio modeling, and place name information.

The system controller/central processor 105 may also have an interface to an external communications network 109, for example the internet, and a connection to a NTP time server 108 providing coarse time information. In general, the SDRs 102 may be time and frequency synchronized to permit various geolocation techniques to locate wireless signals.

A WASN may be comprised of a variable number of SDRs. A time and location multiplexed WASN may be comprised of a single SDR that is moved from location to location in a serial fashion over the geographic area to be monitored. This configuration represents a minimal cost one suitable for detection, classification and location determination of physically stationary transmitters that transmit for long periods of time. A WASN may also be comprised of a large number of stationary SDRs distributed throughout the geographic area to be monitored similar to a network of base stations of a wireless cellular system. This configuration is better suited for the detection, classification and location of transient signals that only transmit for brief periods of time.

Figure 2:
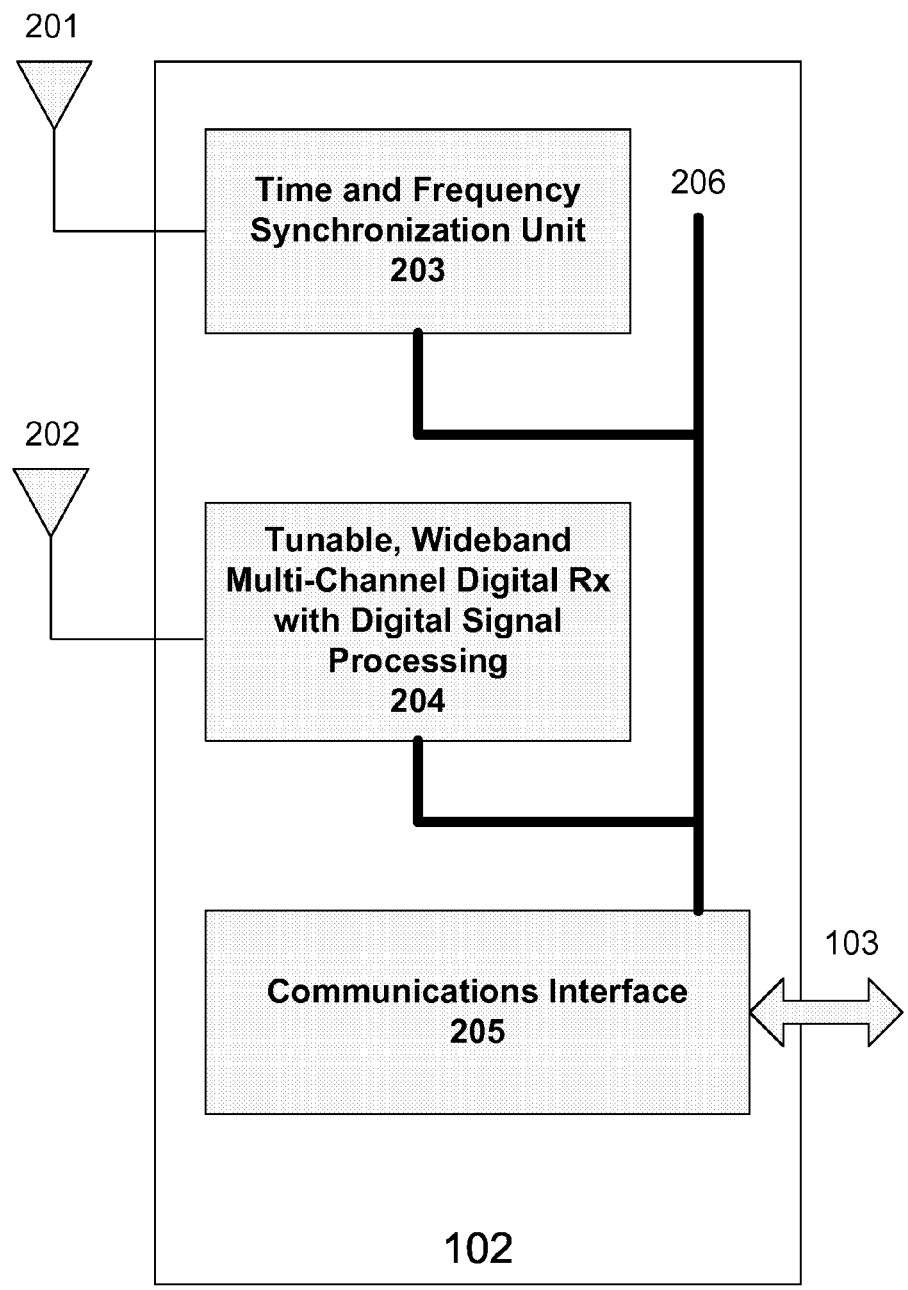
FIG. 2 schematically depicts the major functional nodes of the distributed sensor network receiver.
Figure 3:
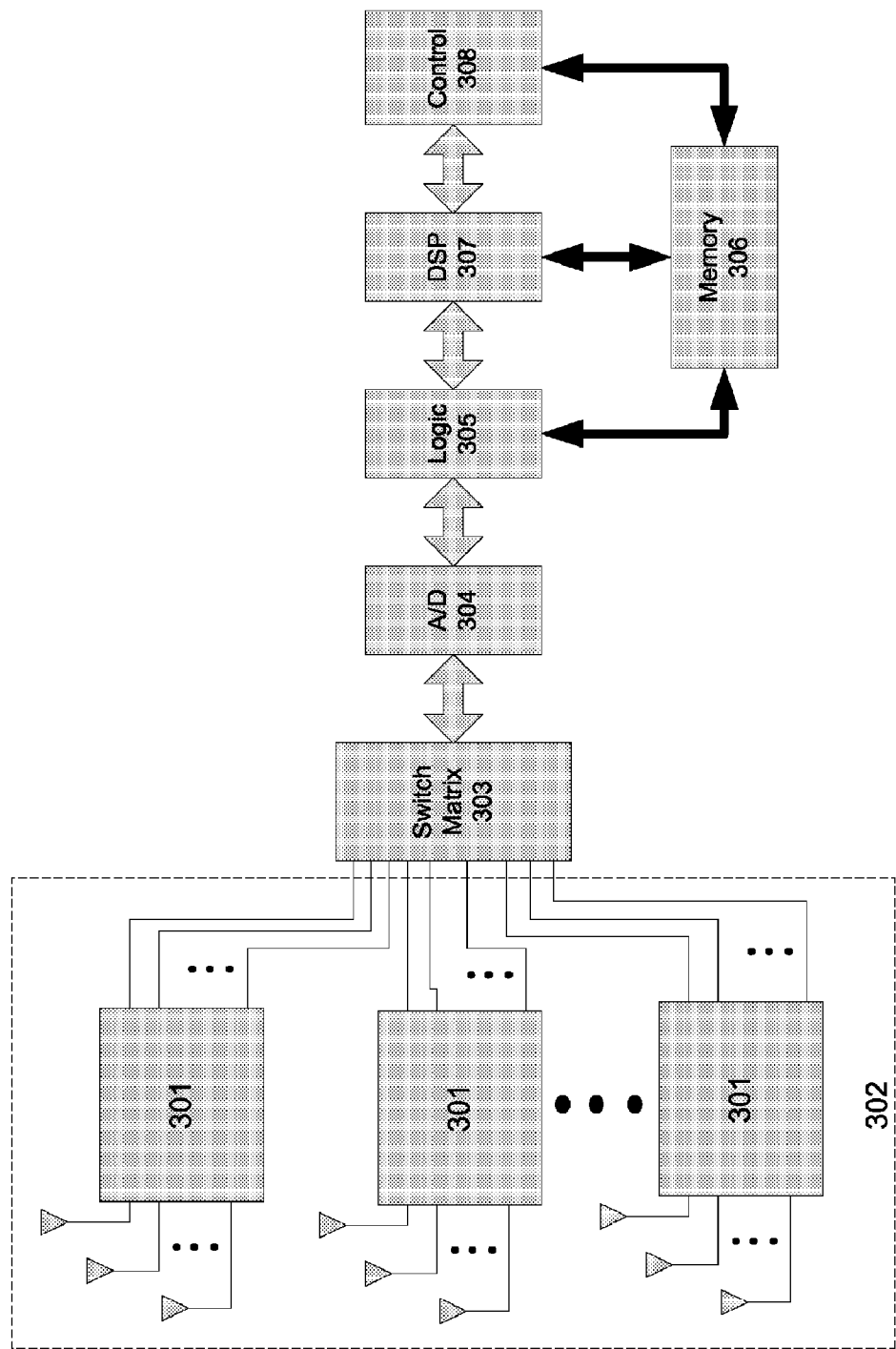
FIG. 3 schematically depicts major functional nodes of the Software Defined Radio (SDR) used by the distributed sensor network receiver.

A fundamental component of a WASN are the SDRs that comprise it. A block diagram of an exemplary SDR is shown in FIGS. 2 and 3. A key virtue of a SDR is the ability to change its configuration by reprogramming its programmable logic over an interface. An SDR may be comprised of one or more multichannel RF to Intermediate Frequency (IF) stages, a switch matrix, a set of analog-to-digital (A/D) converters, programmable logic, programmable digital signal processors, a control processor, memory, synchronization unit and a communication interface. The multichannel RF to IF stage serves to take a band of RF signals received by the antennas they are connected to and filter the signals to limit their bandwidth, amplify the signals, and translate the signals to an IF. The SDR may include a common local oscillator for all channels of a single multichannel RF to IF stage providing frequency coherence. Multiple multichannel RF to IF stages may use different local oscillators but a common time and frequency reference may be provided by the time and frequency synchronization unit. The switch matrix serves to select specific channels from the multitude of multichannel RF to IF stages and present the channels to the A/Ds. The A/Ds convert multiple channels of analog signals to a digital format at a specified sampling rate.

Once converted to a digital format, the signals can be operated upon by the programmable logic stage. A key feature of programmable logic is the ability to reprogram the logic over an interface to change its capability. Typical operations of the programmable logic are I and Q detection, further bandpass filtering and decimation of the sample rate, specific signal detection, and memory storage. The programmable digital signal processing (DSP) stage may be comprised of a number of programmable digital signal processors that can further process the signals from the programmable logic stage. Examples of the signal processing that are performed by the DSPs are detection, demodulation, equalization and location processing. The control processor may control and coordinate all of the resources of the SDR. The communications interface provides an interface external to the SDR to permit control of the SDR by the system controller/central processor and the transfer of data.

Figure 4:
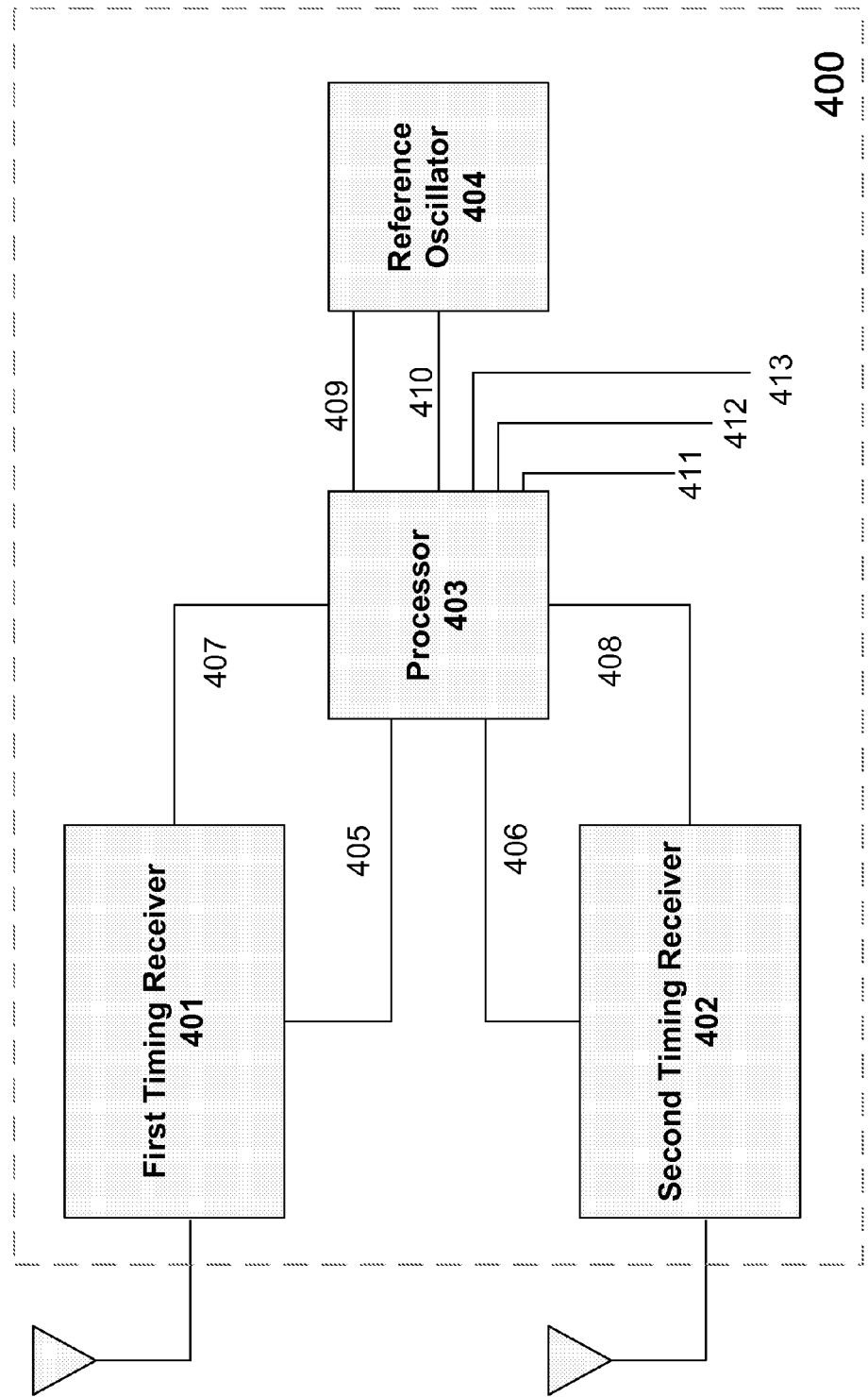
FIG. 4 schematically depicts major functional nodes of the timing reference subsystem of the distributed sensor network receiver.

The WASN may provide time and frequency synchronization between SDRs. Synchronization of the SDRs permits very precise time tagging of signals and events as well as the ability to implement various geolocation capabilities. A typical technique for time and frequency synchronizing two or more geometrically separated sites is via a GPS timing receiver. GPS timing receivers can provide very good time and frequency synchronization performance when each GPS timing receiver in the WASN can receive signals from four or more GPS satellites. GPS signals are designed to illuminate the earth at a power level of approximately −130 dBm. This power level is very low and can be further attenuated by the surroundings and environment. Consequently, there are many environments where a sufficient number of GPS satellite signals cannot be received and, therefore, one or more SDRs in the WASN may not be time and frequency synchronized with the other SDRs. This situation may be avoided through the use of multiple signals and techniques to provide time and frequency synchronization. FIG. 4 illustrates the time and frequency synchronization unit of the SDR utilizing a diversity of techniques. Each timing receiver provides a very accurate time clock from its respective signals. In this example the signal is a periodic waveform that provides a sharp rising edge every second. The processor of the time and frequency synchronization unit receives these 1 PPS signals, combines them intelligently, or simply selects one if only one is available, and then disciplines a reference oscillator to the signals.

The system controller/central processor may control the resources of the WASN, monitor the health and status of each resource, and determine the location of signals using information provided by the SDRs. The system controller/central processor may command the SDRs to tune to frequencies and bands and at what time and how long to collect data at the frequencies and bands. Additionally, the system controller/central processor may command the SDR to perform specific functions such as signal detection, signal characterization, and signal classification. The system controller/central processor may also determine the data that will be stored in the central database.

Interference Detection

The synchronous Wide Area Sensor Network (WASN) may provide the capability to monitor critical frequency channels for interference over a wide area, detect when interference occurs, characterize the interference and locate its source. The GPS frequency channels are an example of a critical frequency. Signals from the GPS satellites are used for a multitude of critical applications from synchronizing telecommunications networks to providing navigation for the national air traffic system including the automated landing and take-off of commercial aircraft. Thus GPS signals are important to monitor and assure they are not impaired by inadvertent or intentional interference. The WASN may provide the ability to detect and locate such interference that is continuous in time or transient in nature.

Interference detection and location may begin with apriori knowledge of the signal or signals of interest. The apriori knowledge may includes the frequency channels that the signals occupy and other characteristics such as its spectral characteristics (e.g., spectral density function). An exemplary process for monitoring critical frequency channels for interference, detecting interference and locating interference with the WASN is as follows:

Capture and store time domain data for a predetermined duration over the bandwidth of interest simultaneously for a group of SDRs Pass the captured data through digital downconverters implemented in the programmable logic of the SDRs to I/Q detect, bandlimit, increase the bit resolution and decimate, i.e. reduce, the sample rate of the time domain data.

Break the resulting data into equal time blocks
Convert each time block into the complex frequency domain
Determine the power statistics of each frequency bin
Apply a spectral mask of the legitimate signal
Identify interference by identifying the frequency bins with power that deviates significantly from the frequency mask
Locate the interference utilizing TDOA if the signal possesses sufficient bandwidth, utilize AoA if the signal does not possess sufficient bandwidth and AoA antenna arrays are available at the required SDRs, or utilize PDOA
Store the results in a database for future retrieval The above process may be implemented across the WASN in a continuous fashion or on command to monitor critical frequencies for interference and if interference exists, to locate and characterize the interference.

Signal Detection

The WASN may be used to detect, characterize and locate signals over the wide area it is deployed. This capability permits the survey and catalog of all signals over the frequency range of the SDRs. The WASN may survey and catalog legitimate signals to assure their characteristics are within required specifications. A database of legitimate signals can be compared to the results of the WASN to identify potential illegitimate signals such as unauthorized FM radio stations and video signals. The signal detection capability of the WASN may provide a map of where unlicensed "white space" transmitters may be located as well as the transmit power that a user can emit that would not interfere with legitimate digital TV signals.

An exemplary signal detection process is as follows:
Capture and store time domain data for a predetermined duration over the bandwidth of interest simultaneously for a group of SDRs
Pass the captured data through digital downconverters implemented in the programmable logic of the SDRs to I/Q detect, bandlimit, increase the bit resolution and decimate, i.e. reduce, the sample rate of the time domain data.
Break the resulting data into equal time blocks
Convert each time block into the complex frequency domain
Determine the power statistics of each frequency bin
Identify the frequency bins with a power at the noise floor
Characterize the signals in frequency bins above the noise floor
Locate the detected signals utilizing TDOA if the signal possesses sufficient bandwidth, utilize AoA if the signal does not possess sufficient bandwidth and AoA antenna arrays are available at the required SDRs, or utilize PDOA
Store the results in a database for future retrieval Signal Classification:

The WASN may permit a greater level of classification of signals than previously available because the WASN is comprised of a network of time and frequency synchronized sensors dispersed about a wide geographic area. This may provide the ability to determine the location of the origin of signals. Additionally, once the location is determined, readily available propagation models of the environment may be utilized to provide the ability to estimate the absolute power transmitted by the signal. Thus, the WASN may provide the ability classify most or all signals over the geographic area where it is deployed. Signal characteristics may include:

Center frequency
Bandwidth
Modulation type
Symbol rate (if digitally modulated)
Two Dimensional Location (latitude and longitude)
Absolute power FIG. 1 schematically depicts the major functional nodes of the WASN. The geographically distributed receiver network 101 is shown. Each of the three or more receivers 102 with representative antennae connects via wired or wireless data backhaul network 103 to the controller 105. The controller 105 is a generic computer processing server with custom software to perform tasking, scheduling, signal detection, signal characterization and location estimation. The controller 105 is served by a database system 106 allowing calibration data, historical location data, geographical data, and propagation models to be used in the location estimation processing. The controller 105 also connects via digital data link (such as an internal data bus, a local area network or a wide area data network) to a user interface 107 which serves as the human-machine-interface with the Wide Area Sensor Network (WASN). The various operation, administration, provisioning, and maintenance operations may be accomplished via the user interface 107. The user interface 107 in this example is implemented as a software application running on a client processor platform.

The NTP 108 (Network Time Protocol) node supplies a stable time reference to the controller 105 via a TCP/IP based digital data link. The operational details of NTP can be found in RFC 778, RFC 891, RFC 956, RFC 958, and RFC 1305. Network 109 represents an external network, such as the internet, providing auxiliary information to the WASN such as GPS assistance data or lists of legitimate emitters.

FIG. 2 illustrates a more detailed depiction of the Software Defined Radio (SDR) receiver 102 shown in FIG. 1. As shown, a first antenna structure 201 allows over the air determination of the common system time reference required to synchronize the SDR network 101. The system time and frequency reference in this example is distributed over internal analog and digital buses 206 from the Timing Receiver 203 to the Tunable Wideband Digital Receiver 204 and the Communications Interface 205.

A second set of antenna 202 serves the Tunable Wideband Digital Receiver 204. The second Antenna structure 202 may include specialized directional antenna for Angle-of-Arrival signal location determination.

The Tunable Wideband Digital Receiver 204 is preferably implemented as a software defined radio (SDR). The communications interface 205 serves to route and bridge location related and timing information to the controller 105 over the backhaul network 103.

FIG. 3 schematically depicts the functional stages of a multiband, tunable, multichannel wideband software defined radio (SDR). The antenna structure 302 allows for multiple receive antenna to be used for a single SDR as well as multiple time and frequency synchronization sources. The antennas are connected to an RF stage 301 where amplification, filtering and translation to an intermediate frequency (IF) of the bandwidth of interest is performed. Multiple RF to IF stages 301 are used to support reception of bands of interest, thus overcoming limitations inherent in amplifiers and filters occurring when very wide bandwidths are required.

The various RF to IF stages 301 feed a analog switch matrix 303 allowing the SDR to select the band to be observed. The multichannel output is passed to the Analog to Digital Converter (A/D) 304 where multiple channels of the band limited signal is converted to a digital representation.

FIG. 4 provides a more detailed view of the diversity timing receiver 400 and associated antenna structures that serves the SDR as a time and frequency reference. In the timing receiver 400, a first 401 and second 402 timing receiver is used. The dual timing receivers 401 402 allow for determination of a clock and frequency reference in cases where one receiver is blocked. The dual timing receiver 401 402 arrangement also allows for increased holdover in cases where one receiver is temporarily blocked.

The first timing receiver 401 is connected to a central processor via digital data link 405 and an analog timing link 407 allowing for operational messaging and timing related messages to pass between the receiver and the processor as well as allowing analog timing signals to pass from the first timing receiver 401 to the processor.

The second timing receiver 402 is connected to a central processor via digital data link 406 and an analog timing link 408 allowing for operational messaging and timing related messages to pass between the receiver and the processor as well as analog timing signals to pass from the first second receiver 403 to the processor.

The processor 403 is connected to a reference oscillator 404 via data feedback control link 409 and an analog timing link 410 allowing for fine control of the oscillator's frequency as well as allowing analog timing signals to pass from the reference oscillator 404 to the processor.

The processor 403 may discipline the reference oscillator 404 to either timing receiver to provide a time and frequency reference to the SDR depending upon which timing receiver has the better reception on their signals.

The SDR is provided the time and frequency reference via an analog timing signal 411, timing messaging via a digital link 412 and an analog frequency reference 413.

User Interface:

The WASN may provide the capability to measure and characterize wireless signals over a wide area in multiple dimensions. A few of these dimensions are:

Time
Frequency
Power
Location

Figure 5:
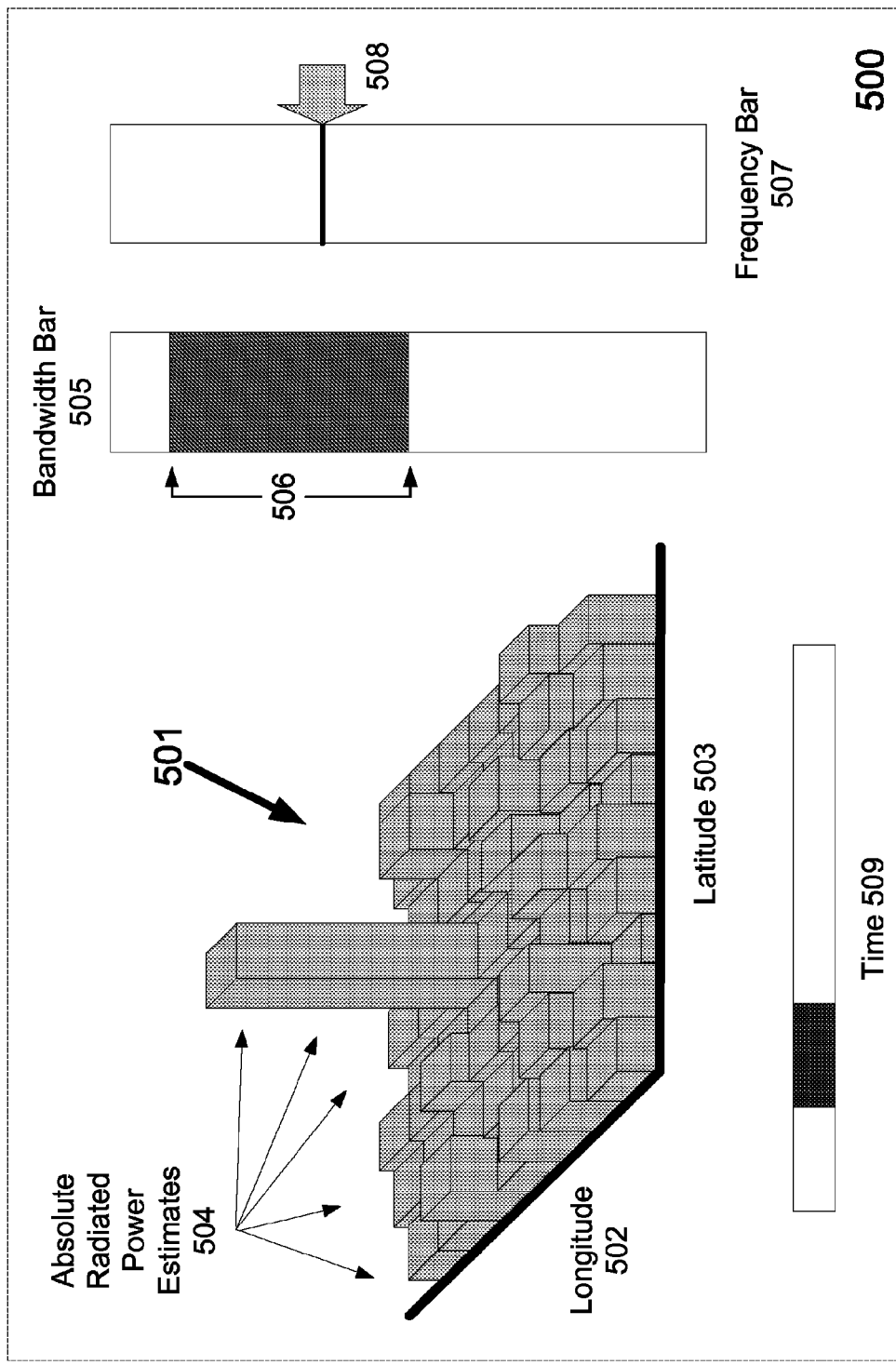
FIG. 5 depicts an example user interface for the Wide Area Sensor Network.

The user interface for the WASN may provide user control of its resources as well as a display of its results. The above four dimensions of data may be displayed in two forms. The first is illustrated in FIG. 5 as a contour plot of power over a range of latitude and longitude, in location, for a specific time as indicated by the time slider and a specific frequency and bandwidth as indicated by the frequency and bandwidth sliders. The other form is a 3-D plot of time and frequency versus power with the 2D location defined by positioning a cursor over a range of latitude and longitude as shown in FIG. 6.

FIG. 5 depicts an example of the user interface with the WASN. Illustrated is a example screenshot 501 of the user interface displaying an exemplary campaign. A 3-D map 501 displays the location of an emitter via the latitude 503 axis and the longitude 502 axis as determined by the location processor and the computed absolute radiated power 503 over the examined bandwidth. The examined bandwidth 506 is shown on a bar display 505. The center frequency 508 of the examined bandwidth is depicted on a frequency bar display 507. The time of the spectral examination can be selected on the time bar 506.

The user interface 500 in this example provides both input and output and uses the database facility of the WASN to store signal and location data over time. Each bar display allows the user to determine the signal power and location for an adjustable bandwidth, center frequency and time span using a mouse-driven point-and-click interface.

Figure 6:
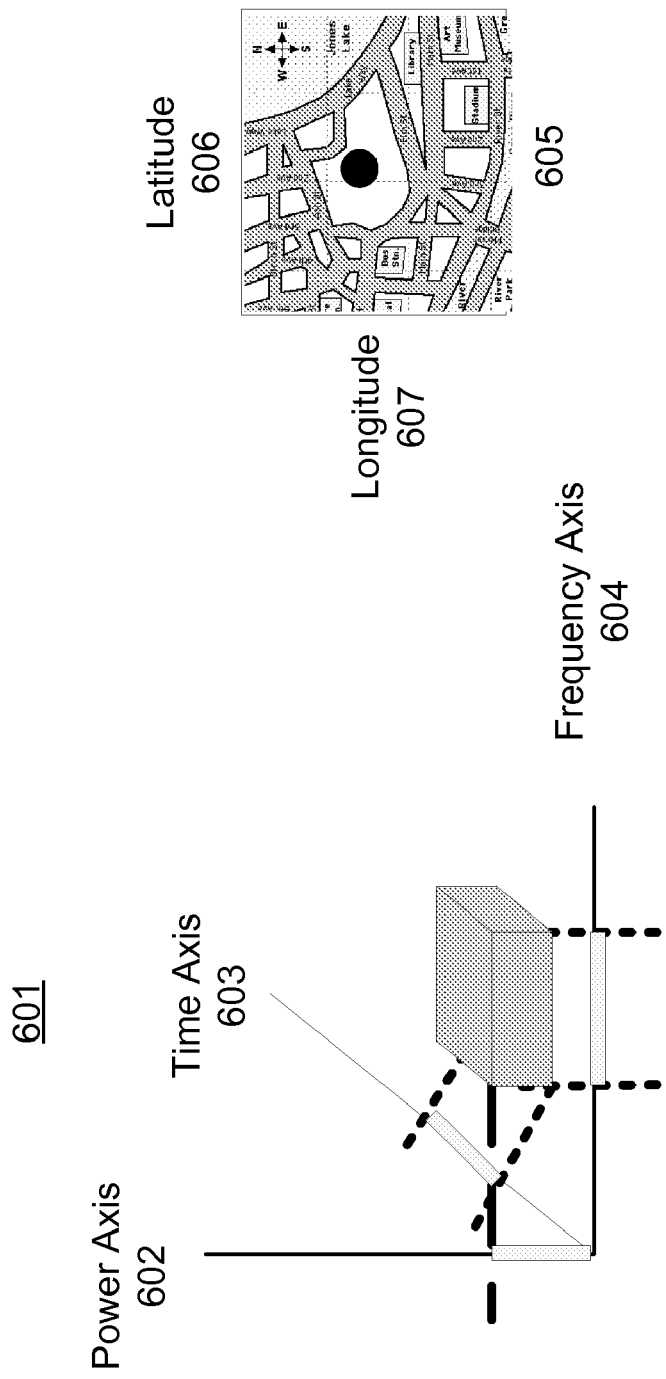
FIG. 6 depicts another example user interface for the Wide Area Sensor Network.

FIG. 6 illustrates another graphical user interface example in which a 3-dimensional map 601 of power 602, time 603, and frequency 604 is used with a geographic map shown here as a 2-dimensional street map. The location determination may include an altitude or elevation. Using the persistent database to store signal and location information, the user interface can be used to both show real-time campaign data as well as past location and signal data.

Applications:

Applications may reside on the system controller/central processor and harness the capability of the WASN to perform a number of operations. WASN applications may include:

Interference Detection and Localization

The Interference Detection and Location application utilizes the capability of the WASN to monitor user defined critical bands, channels and frequencies to detect the presence of unauthorized signals which will be defined as "interference." Apriori characteristics of authorized signals are utilized to assist in detecting interference. Once detected, the location of the interference is determined. The results of Interference Detection and Location campaigns are stored to the database and/or displayed on the user interface.

Signal Survey

The Signal Survey application utilizes the signal detection capability of the WASN to determine the characteristics and location of all signals over the deployed area of the WASN. Results of a Signal Survey campaign are stored to the database and/or displayed on the user interface.

Unauthorized Transmitter Detection and Localization

The Unauthorized Transmitter application compares the output of a signal survey campaign to a list of authorized signals to identify potential illegal transmitters.

Spoofer Detection

Spoofing signals are signals that attempt to masquerade as a valid signal in order to confuse or spoof one or more users. For example, a spoofing Global-Navigation-Satellite-System (GNSS) signal would attempt to fool the GNSS receiver so that the receiver determines it is in a location that it is not. The WASN detects and locates spoofing signals by acquiring and characterizing the spoofing signals. The characteristics of the spoofing signals are compared to the characteristics of the legitimate signal(s) and the WASN notes when there is a significant deviation. Using the example of a spoofed GNSS signal, the absolute power level of this signal can be determined and if it is much greater than a legitimate GNSS signal, then the signal is identified as a spoofing signal. Another method of identifying a spoofing GNSS signal is to determine that a received signal is identified with a satellite that is not currently available (e.g., over-the-horizon). The current example of a GNSS system is the United States NavStar Global Positioning System (GPS).

Spectral Utilization

The Spectral Utilization application monitors the transmissions from detected signals over a significant length of time to determine the percentage of time that RF energy is being transmitted, which provides a percentage occupancy metric. Additionally, the percentage of time that RF energy is being transmitted quantifies the geographic coverage that this particular transmitter provides. Results of a Spectral Utilization campaign are stored to a database for archive and/or displayed on the user interface.

Unlicensed "White Space" Transmitter Power and Placement

The Unlicensed "White Space" application utilizes the WASN signal detection capability to identify and locate digital TV transmitters as well as estimate the transmitters' transmitted power. With this information the WASN determines the power level that a "white space" transmitter can transmit without interfering with the authorized and licensed digital TV transmitters over the geographic area of the WASN.

Illustrative Example

GNSS Jammer Detection and Location

In this illustrative example, a deployed Wireless Location System (WLS) with a Location Measurement Unit (LMU) network with a geographically distributed network of wideband software receivers is used. Furthermore, the Global Navigation Satellite System(s) (GNSS) is described as the United States NavStar Global Positioning System (GPS). Other GNSS systems (Galileo, GLONASS, Compass, etc.) or combinations of satellites from multiple GNSS systems may be used together with or in place of the GPS system.

The current LMU network is equipped with distinct wideband receivers for uplink and downlink localization and a GPS receiver for receiving a common clock reference. The LMU network itself is relatively protected from low-power GPS jammers and ideally situated to detect and locate the jammers. The LMU GPS receiver is usually installed with minimal nearby obstructions and ideally at an elevation above nearby structures.

GPS wideband CDMA signals are weak and radiate from space vehicles in polar orbit. At a GPS receiver's antenna in the open air, GPS signals strength range from 130-160 dbm or about $1\times10^{-16}$ watts. Given the wavelengths used, reflections from the ground and surrounding structures are even further attenuated. It is the ratio of the signal power to the noise power per unit bandwidth that determines the ability to track and use each satellite. Therefore, GPS jammers (even unintentional ones) typically transmit broadband white/grey noise to increase the local noise floor and thus disrupt any local GPS receivers. To locate the jammers, the problem is first to detect the jammer(s), and second to locate the jammers.

Figure 7:
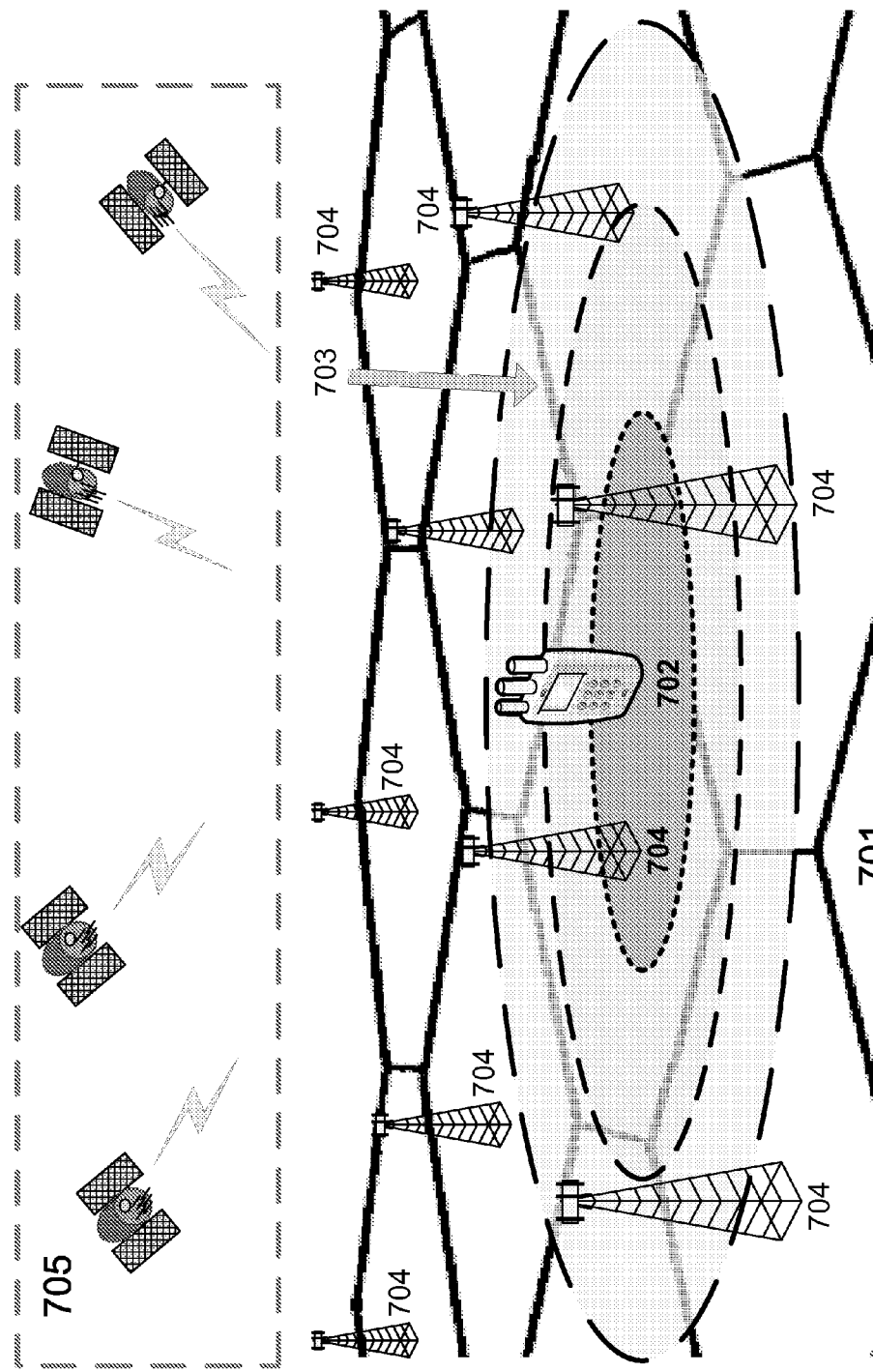
FIG. 7 illustrates an example use of the WASN in detecting and locating a Global Navigation Satellite System (GNSS) jammer.

As illustrated in FIG. 7, the wireless communications system 701 comprises cells distributed to provide coverage over the geographic service area. Radio equipment for the communications network is housed in cell sites 704 co-located with the SDR receivers, providing the SDR network with geographic distribution and shared facilities and antenna mounts. The GNSS system (the GPS system in this example) is shown in 705 with accompanying radio broadcasts.

The GPS jammer 702 transmits the jamming radio signal that propagates over an area 703 determined by the transmit power and ground clutter. The propagation pattern 703 may also be shaped by a directional transmission antenna.

Using known methods, TruePosition's GPS receiver subsystem can detect the presence of jamming and alert outside parties. Such jamming may be limited to a single LMU or a group of LMUs. Known non-military GNSS jammers have ranges from 10's of meters to 10's of kilometers but are likely to be relatively low-powered portable devices.

In order to detect an intentional or unintentional source of GNSS jamming, the LMU can maintain a baseline Signal to Noise Ratio (SNR) over a complete cycle of visible GPS satellites. When a threshold SNR is crossed, a jammer location event can be initiated.

For small and/or low powered GNSS jammers, location of the GNSS jammer may be determined with techniques such as time of arrival (TOA) or power of arrival (POA) based ranging, or TDOA or AOA depending upon the transmit power, the RF environment, and duration of the signal. Modifications to the current LMU GPS receiver antenna or replacement of the GPS receiver by a wideband SDR may be used to enable the GPS jammer receiver. For large scale GNSS jamming events, the affected LMUs can be plotted and the center of gravity of the LMU coverage area can be determined as the jammer location. LMUs can be selected for TDOA and/or AOA location determination based on a preliminary TOA or POA based location. LMUs can further be selected based on the location technology deployed and the power and bandwidth of the jamming signal(s) in order to provide a more accurate location of the jammer.

If an LMU is located near a jammer and loses its GPS signal, the LMU can nevertheless be potentially used to collect the jammer's transmitted reference signal even if the LMU cannot be used as a cooperator. Using downlink beacon monitoring for timing or messaging from the network for coarse timing, a reference signal can be collected, compressed, and distributed to cooperating LMUs that have good timing references.

For general call location determination, the technique of using an LMU that does not have accurate timing for detecting and demodulating the reference signal can still be used. Such an LMU would not be used as a cooperator since its timing is not accurate enough for location processing. However, through downlink monitoring and/or network timing, the LMU can be used for detection and demodulation of the jammer's transmitted reference signal.

In the case when locating a GNSS jamming source, a TDOA or AOA location may be performed. Assuming that the GNSS jamming signal is a type of noise source that is changing and is always on, an LMU or similar device can collect a sample of the signal at a specific time interval. The data may be compressed and sent to cooperating LMUs to perform a correlation and determine a location.

In the case where the system is locating a jamming source that is a clean tone or series of tones and not changing over time, the change in SNR of the GPS signal from its baseline SNR at all of the cooperating LMUs can be used to calculate a location based on the power level affect of SNR at each affected LMU site, similar to the process of calculating a TDOA location. Instead of time difference of arrival, the power gradient (POA or PDOA) of the jamming signal may be used.

Illustrative Example

GNSS Spoofer Detection and Location

In another illustrative example, the geographically distributed LMU network with its co-located wideband and GPS receivers can be used to locate GNSS spoofers in accordance with the present disclosure.

GNSS spoofing generally involves a transmitter mimicking GNSS satellite transmissions, typically at a higher power then delivered by the space vehicle at receiver elevation. In some cases, identification information of space vehicles not in view (e.g., over-the-horizon) of the receiver can be used to mimic the space vehicle for spoofing.

When the spoofer is mimicking GNSS satellite transmissions, the distributed receiver network allows for detection of the spoofing transmitter by the increase in signal power of the spoofing signal.

In the case where identification information of space vehicles not in view of the receiver is used to mimic the space vehicle, the addition of a satellite not predicted to be available due to orbital mechanics can be detected.

In both cases, the wideband spoofing signal can be used to determine the location of the spoofing transmitter via PDOA, TOA, TDOA, AoA, or hybrid techniques.

Illustrative Example

IMSI Catcher Detection

As described in common assigned U.S. patent application Ser. No. 11/948,244 "Autonomous Configuration of a Wireless Location System," incorporated herein by reference, the wideband downlink receivers of the LMU network can be used to detect, identify, and locate GSM, CDMA, CDMA-2000, and UMTS wireless communications systems via base station beacon transmissions. In the Autonomous Configuration application, new base stations can be determined as well as changes to base station identification and frequency allotments.

A rogue Base Transceiver Station (BTS) (also called an IMSI-catcher) is described in European Patent EP1051053 "Method for identifying a mobile phone user or for eavesdropping on outgoing calls" and in U.S. patent application Ser. No. 11/996,230; "Acquiring Identity Parameters by Emulating Base Stations." As described, a rogue BTS simulates a wireless network and mimics a base station belonging to the local wireless communications network by transmitting a beacon belonging to an already existing base station. Using the detection, identification, and location capabilities of the LMU network of geographically distributed receivers and the Serving Mobile Location Center (SMLC) as the controller, the duplicative mimicked base station beacons can be detected, identified and located.

Figure 8:
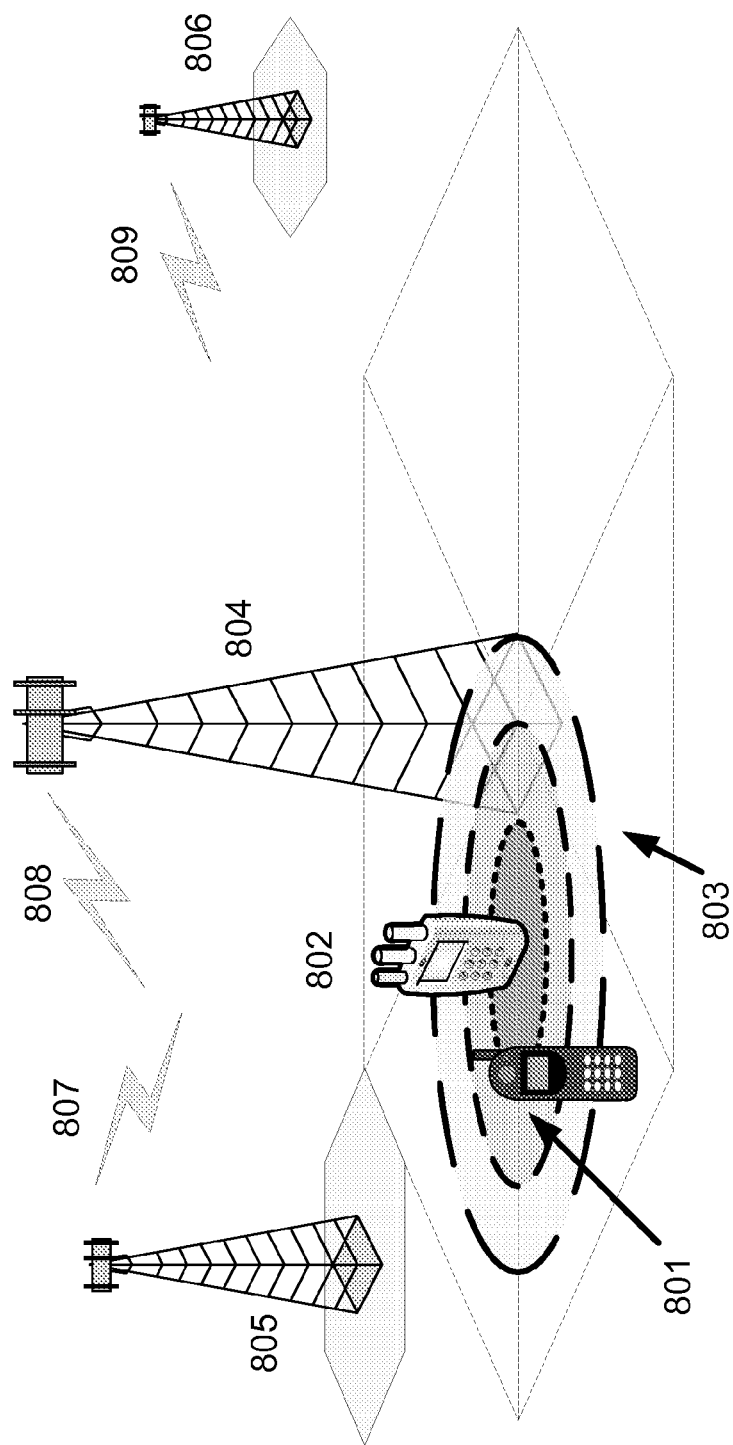
FIG. 8 illustrates an example use of the WASN in detecting and locating a rogue Base Station.

FIG. 8 illustrates an example of the distributed network-based IMSI-catcher rogue BTS locator in accordance with the present disclosure. A low powered IMSI-catcher 802 collects information on the local beacons 807 808 809 including power, identification, and neighbor lists. The IMSI-catcher 802 then broadcasts its own mimic beacon which propagates over a geographic area 803. The target mobile/user equipment 801 performs a location update to the IMSI-catcher's emulated network.

The SDR receivers in this example are co-located in the close 804, neighboring 805, and proximate 806 cells. Having in the past already detected, identified, located and stored the close 804 neighboring 805 and 806 proximate cells, the SDR receivers may detect the mimic beacon 803 and identify a rogue BTS. The SDR network is tuned to locate the rogue BTS and information regarding the rogue BTS is delivered to the user interface for analysis and action.

Figure 9A:
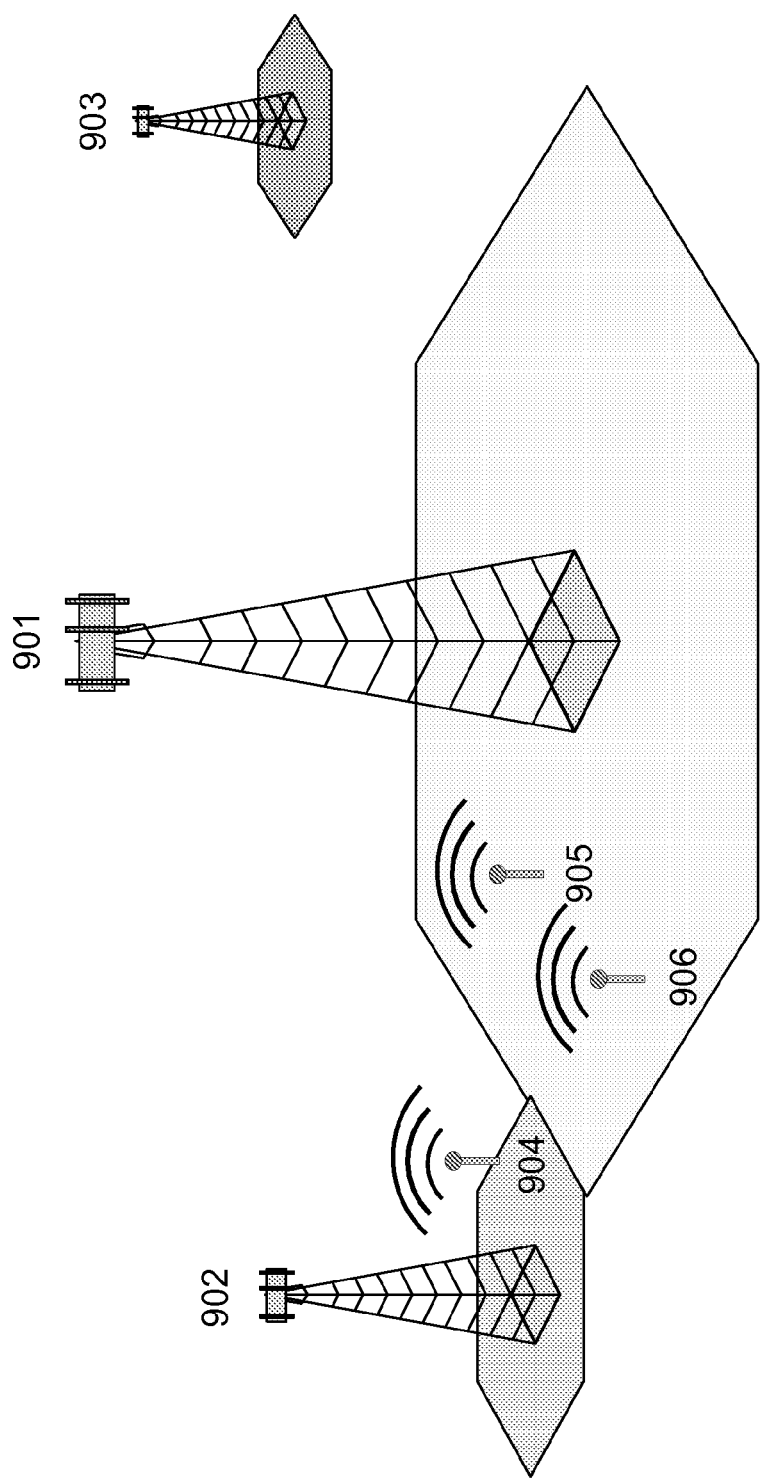
FIG. 9a illustrates an example use of the WASN in detecting and locating an intermittent inadvertent interferer.
Figure 9B:
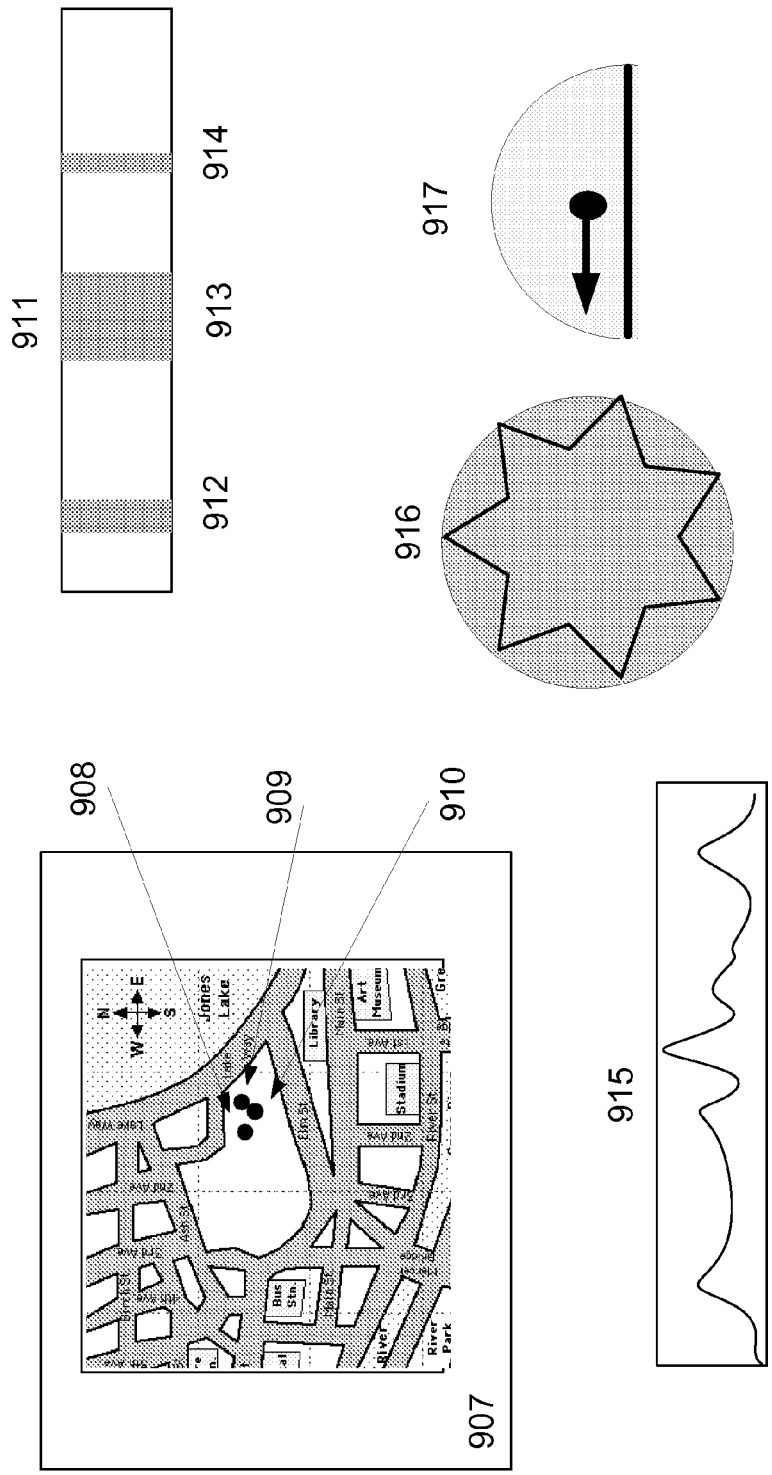
FIG. 9b illustrates an example visualization of the WASN user interface when detecting and locating an intermittent inadvertent interferer.
Figure 10:
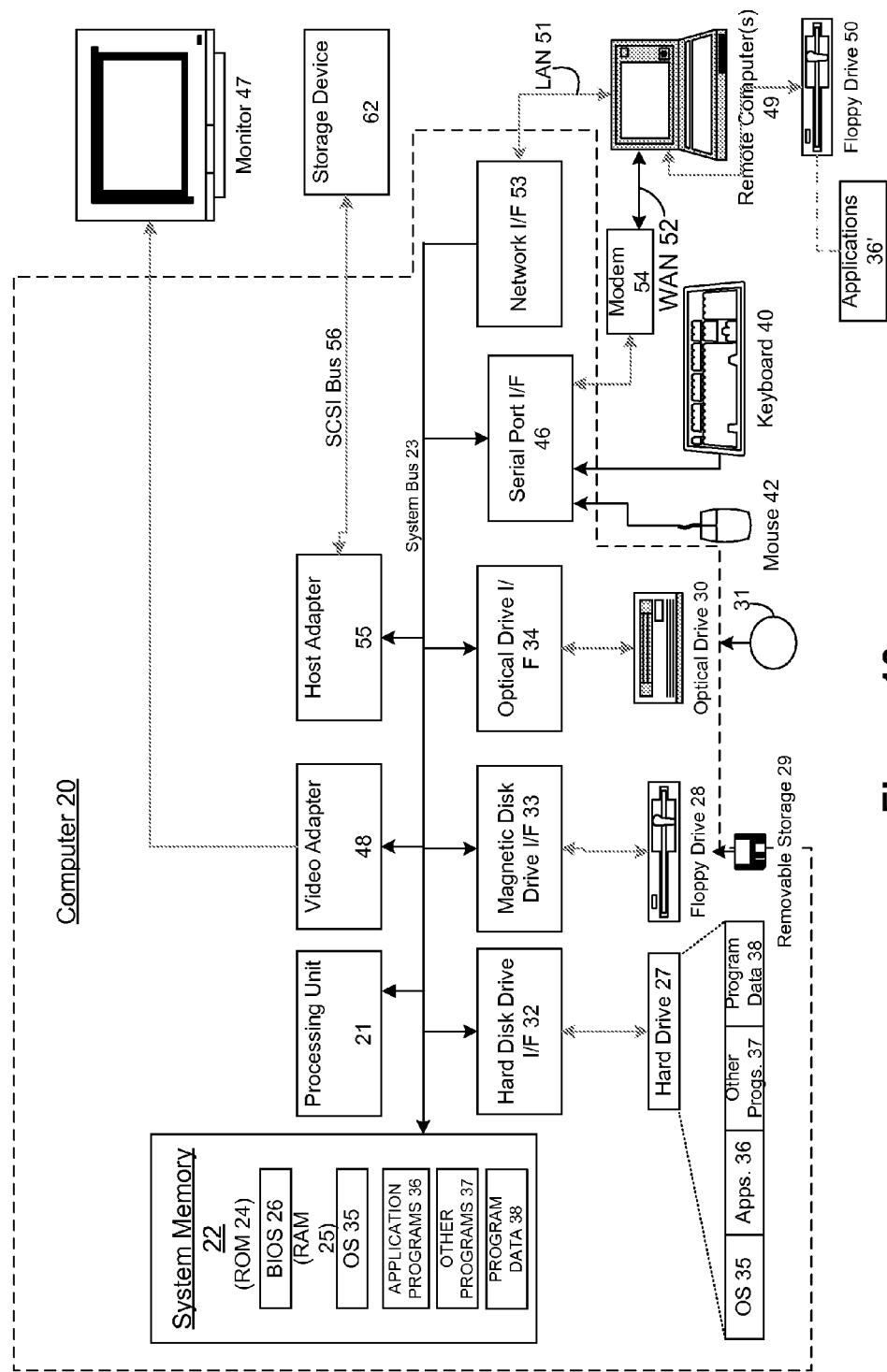
FIG. 10 depicts an example of a computing system which may be configured to implement aspects of FIGS. 1-9b.

In FIG. 9a, an example use of the WASN is depicted. In this example, sensor receivers 901 902 903 are distributed over a geographic area served by a wireless communications or broadcast system. At disparate times, interfering signals 904 905 906 are detected and located. FIG. 9b depicts a resulting user interface display. On the map display 907, the sources of the aperiodic interfering signals 904 905 906 are displayed geographically 908 909 910. The time and duration of the interference is displayed on the time bar display 911 with interfering events 904 905 906 shown graphically as 912 913 914. The spectral bar 915 displays the distribution of power over frequency for event 904. The compass rose 916 is grayed out, showing that no heading is available for event 904. The speed indicator 917 indicates a speed of zero which, together with the compass rose, indicates that event 904 was stationary over the time duration 912.

D. CONCLUSION

Any of the above mentioned aspects can be implemented in methods, systems, computer readable media, or any type of manufacture. The term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s).

FIG. 1 depicts an example of a computing system which is configured to with aspects of the invention. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the invention may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the invention are particularly well-suited for computer systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects and embodiments of the invention described herein have been shown and described, it will be apparent to those skilled in the art that, based upon the teachings herein, changes and modifications may be made and, therefore, the appended claims are to encompass within their scope all such changes and modifications as are within the true spirit and scope of the inventions described herein.

What is claimed:

1. A method for detecting, classifying and locating radio frequency (RF) emitters in a wide area wireless communications network comprising one or more software defined radios, comprising:
    maintaining a historical database of RF signal information, the RF signal information representing RF signals received by said one or more software defined radios for a predetermined duration over a predetermined bandwidth at a plurality of locations within said wide area wireless communications network;
    detecting a presence of an interfering RF signal;
    characterizing a received power of said interfering RF signal;
    determining a bandwidth of said interfering RF signal; and
    locating the source of said interfering RF signal via a network-based wireless location technique.

2. The method of claim 1, wherein said network-based wireless location technique is time-difference-of-arrival (TDOA).

3. The method of claim 1, wherein said network-based wireless location technique is a combination of TDOA and Angle of Arrival (AOA).

4. The method of claim 1, wherein said network comprises a single software defined radio, further comprising moving said software defined radio to multiple locations in a serial fashion over a geographic area to be monitored.

5. The method of claim 1, further comprising synchronizing time and frequency between software defined radios.

6. The method of claim 5, wherein said synchronizing is performed using a GPS timing receiver.

7. The method of claim 1, wherein said characterizing comprises estimating an absolute power transmitted by the interfering RF signal by using propagation models of a local environment.

8. The method of claim 1, wherein the software defined radios are calibrated in power to measure absolute power of the received RF signals.

9. The method of claim 7, wherein said locating comprises estimating radiated power of the source of said interfering RF signal by determining the source's power and determining a location as a function of characteristics of the one or more software defined radios' receive antennae and an RF propagation model.

10. A method for detecting, classifying and locating radio frequency (RF) emitters, comprising:
    receiving time domain RF data corresponding to a signal to be monitored, said RF data representing said signal during a predetermined duration and over a predetermined bandwidth;
    associating the received time domain RF data with a plurality of equal time intervals spanning said predetermined duration;
    converting the time domain RF data associated with said equal time intervals into frequency domain data corresponding to a plurality of frequency bins;
    determining at least one power characteristic for each of said frequency bins and for said signal to be monitored;
    for each of said frequency bins, determining that a source of interference is present when the at least one power characteristic for the frequency bin substantially differs from the at least one power characteristic of said signal to be monitored; and
    locating the source of interference using a geolocation determination algorithm.

11. The method of claim 10, further comprising receiving information for the signal to be monitored, wherein said information comprises at least one of frequency channels occupied by said signal and a spectral density function.

12. The method of claim 10, further comprising passing the time domain RF data through digital downconverters to perform I/Q detection, bandlimiting, increasing bit resolution, and reducing a sample rate of the time domain RF data.

13. The method of claim 12, wherein said digital downconverters are implemented in programmable logic in the software defined radios.

14. The method of claim 10, wherein said locating is performed using at least one of Time of Arrival (TOA), Time Difference of Arrival (TDOA), Angle of Arrival (AOA), Power of Arrival (POA), Power Difference of Arrival (PDOA), and Frequency Difference of Arrival (FDOA) techniques.

15. The method of claim 10, wherein the method is performed on a continuous basis.

16. The method of claim 10, wherein the method is performed upon receiving an indication to initiate a search for interference.

17. The method of claim 10, wherein said locating further comprises using an additive probability of a plurality of geolocation techniques to render a best location estimate.

18. The method of claim 10, further comprising determining an effective utilization of RF channels by measuring RF power versus frequency and time.

19. The method of claim 10, wherein said network comprises a single software defined radio, further comprising moving said software defined radio to multiple locations in a serial fashion over a geographic area to be monitored.

20. The method of claim 10, further comprising synchronizing time and frequency between software defined radios.

21. The method of claim 20, wherein said synchronizing is performed using a GPS timing receiver.

22. The method of claim 20, wherein said synchronizing is performed using a plurality of signals and synchronizing techniques.

23. The method of claim 10, further comprising estimating an absolute power transmitted by the source of interference by using propagation models of a local environment.

24. The method of claim 10, wherein said locating further comprises determining velocity and heading of the source of interference using a Frequency Difference of Arrival (FDOA) technique.

25. The method of claim 10, wherein the software defined radios are calibrated in power to measure absolute power of the received time domain RF data.

26. The method of claim 10, further comprising time stamping data representing located sources of interference and storing the time stamped data in a database.

27. The method of claim 23, wherein said locating comprises estimating radiated power of the source of interference by determining the source's power and determining a location as a function of characteristics of the one or more software defined radios' receive antennae and an RF propagation model.

28. The method of claim 10, further comprising generating an alert when unauthorized signals are detected and located.

29. The method of claim 10, further comprising determining a percentage occupancy metric over a predetermined geographic area as a function of a percentage of time during a predetermined time period that the signal is transmitted.

30. The method of claim 10, wherein the source of interference is a spoof signal.

31. The method of claim 30, wherein the signal to be monitored is a Global Navigation Satellite System (GNSS) signal.

32. The method of claim 31, wherein said determining at least one power characteristic comprises determining an absolute power level and said determining that a source of interference is present comprises determining that the absolute power level exceeds an absolute power level of the signal to be monitored.

33. The method of claim 32, wherein said determining that a source of interference is present comprises determining that a satellite associated with the at least one power characteristic is over the horizon.

34. A method for detecting, classifying and locating radio frequency (RF) signals in a wide area wireless communications network comprising one or more software defined radios, comprising:
receiving time domain RF data corresponding to a signal to be monitored, said RF data representing said signal during a predetermined duration and over a predetermined bandwidth;
associating the received time domain RF data with a plurality of equal time intervals spanning said predetermined duration;
converting the time domain RF data associated with said equal time intervals into frequency domain data corresponding to a plurality of frequency bins;
determining at least one power characteristic for each of said frequency bins and for said signal to be monitored;
identifying frequency bins with at least one power characteristic above a noise floor;
for each of the identified frequency bins with at least one power characteristic above said noise floor, characterizing signals in the frequency bin; and
locating the characterized signals using a geolocation determination algorithm.

35. The method of claim 34, further comprising receiving information for the signal to be monitored, wherein said information comprises at least one of frequency channels occupied by said signal and a spectral density function.

36. The method of claim 34, further comprising passing the time domain RF data through digital downconverters to perform I/Q detection, bandlimiting, increasing bit resolution, and reducing a sample rate of the time domain RF data.

37. The method of claim 36, wherein said digital downconverters are implemented in programmable logic in the software defined radios.

38. The method of claim 34, wherein said locating is performed using at least one of Time of Arrival (TOA), Time Difference of Arrival (TDOA), Angle of Arrival (AOA), Power of Arrival (POA), Power Difference of Arrival (PDOA), and Frequency Difference of Arrival (FDOA) techniques.

39. The method of claim 34, wherein the method is performed on a continuous basis.

40. The method of claim 34, wherein the method is performed upon receiving an indication to initiate a signal search.

41. The method of claim 34, wherein said locating further comprises using an additive probability of a plurality of geolocation techniques to render a best location estimate.

42. The method of claim 34, further comprising determining an effective utilization of RF channels by measuring RF power versus frequency and time.

43. The method of claim 34, further comprising determining a location of an unlicensed white space transmitter and a maximum power that the white space transmitter can transmit without interfering with digital over-the-air television service.

44. The method of claim 34, wherein said network comprises a single software defined radio, further comprising moving said software defined radio to multiple locations in a serial fashion over a geographic area to be monitored.

45. The method of claim 34, further comprising synchronizing time and frequency between software defined radios.

46. The method of claim 45, wherein said synchronizing is performed using a GPS timing receiver.

47. The method of claim 45, wherein said synchronizing is performed using a plurality of signals and synchronizing techniques.

48. The method of claim 34, further comprising estimating an absolute power transmitted by a source of interference by using propagation models of a local environment.

49. The method of claim 35, wherein said information comprises a catalog of legitimate signals.

50. The method of claim 49, further comprising comparing the characterized signals with said legitimate signals to identify illegitimate signals.

51. The method of claim 34, wherein the software defined radios are calibrated in power to measure absolute power of the received time domain RF data.

52. The method of claim 34, further comprising time stamping data representing characterized signals and storing the time stamped data in a database.

53. The method of claim 48, wherein said locating comprises estimating radiated power of the source of interference by determining the source's power and determining a location as a function of characteristics of the one or more software defined radios' receive antennae and an RF propagation model.

54. The method of claim 50, further comprising generating an alert when illegitimate signals are identified.

55. The method of claim 34, further comprising determining a percentage occupancy metric over a predetermined geographic area as a function of a percentage of time during a predetermined time period that the characterized signals are transmitted.

56. A system for detecting, classifying and locating radio frequency (RF) emitters in a wide area wireless communications network, the system comprising one or more software defined radios with a wide instantaneous bandwidth and tuning range, at least one processor communicatively coupled to the one or more software defined radios, and at least one memory communicatively coupled to said at least one processor, the at least one memory storing therein computer readable instructions capable of configuring the system to perform the following method:
    receiving time domain RF data corresponding to a signal to be monitored, said RF data representing said signal during a predetermined duration and over a predetermined bandwidth;
    associating the received time domain RF data with a plurality of equal time intervals spanning said predetermined duration;
    converting the time domain RF data associated with said equal time intervals into frequency domain data corresponding to a plurality of frequency bins;
    determining at least one power characteristic for each of said frequency bins and for said signal to be monitored;
    for each of said frequency bins, determining that a source of interference is present when the at least one power characteristic for the frequency bin substantially differs from the at least one power characteristic of said signal to be monitored; and
    locating the source of interference using a geolocation determination algorithm.

57. The system of claim 56, further comprising receiving information for the signal to be monitored, wherein said information comprises at least one of frequency channels occupied by said signal and a spectral density function.

58. The system of claim 56, further comprising passing the time domain RF data through digital downconverters to perform I/Q detection, bandlimiting, increasing bit resolution, and reducing a sample rate of the time domain RF data.

59. The system of claim 58, wherein said digital downconverters are implemented in programmable logic in the software defined radios.

60. The system of claim 56, wherein said locating is performed using at least one of Time of Arrival (TOA), Time Difference of Arrival (TDOA), Angle of Arrival (AOA), Power of Arrival (POA), Power Difference of Arrival (PDOA), and Frequency Difference of Arrival (FDOA) techniques.

61. The system of claim 56, wherein the method is performed on a continuous basis.

62. The system of claim 56, wherein the method is performed upon receiving an indication to initiate a search for interference.

63. The system of claim 56, wherein said locating further comprises using an additive probability of a plurality of location techniques to render a best location estimate.

64. The system of claim 56, further comprising determining an effective utilization of RF channels by measuring RF power versus frequency and time.

65. The system of claim 56, wherein said network comprises a single software defined radio, further comprising moving said software defined radio to multiple locations in a serial fashion over a geographic area to be monitored.

66. The system of claim 56, further comprising synchronizing time and frequency between software defined radios.

67. The system of claim 66, wherein said synchronizing is performed using a GPS timing receiver.

68. The system of claim 66, wherein said synchronizing is performed a plurality of multiple signals and synchronizing techniques.

69. The system of claim 56, further comprising estimating an absolute power transmitted by the source of interference by using propagation models of a local environment.

70. The system of claim 56, wherein the software defined radios are controlled by a central controller.

71. The system of claim 56, wherein said locating further comprises determining velocity and heading of the source of interference using a Frequency Difference of Arrival (FDOA) technique.

72. The system of claim 56, wherein the software defined radios are calibrated in power to measure absolute power of the received time domain RF data.

73. The system of claim 56, further comprising time stamping data representing located sources of interference and storing the time stamped data in a database.

74. The system of claim 56, wherein said locating comprises estimating radiated power of the source of interference by determining the source's power and determining a location as a function of characteristics of the one or more software defined radios' receive antennae and an RF propagation model.

75. The system of claim 56, further comprising generating an alert when unauthorized signals are detected and located.

76. The system of claim 56, further comprising determining a percentage occupancy metric over a predetermined geographic area as a function of a percentage of time during a predetermined time period that the signal is transmitted.

77. The system of claim 56, wherein the source of interference is a spoof signal.

78. The system of claim 77, wherein the signal to be monitored is a Global Navigation Satellite System (GNSS) signal.

79. The system of claim 78, wherein said determining at least one power characteristic comprises determining an absolute power level and said determining that a source of interference is present comprises determining that the absolute power level exceeds an absolute power level of the signal to be monitored.

80. The system of claim 78, wherein said determining that a source of interference is present comprises determining that a satellite associated with the at least one power characteristic is over the horizon.

81. A system for detecting, classifying and locating radio frequency (RF) signals in a wide area wireless communications network the system comprising one or more software defined radios with a wide instantaneous bandwidth and tuning range, at least one processor communicatively coupled to the one or more software defined radios, and at least one memory communicatively coupled to said at least one processor, the at least one memory storing therein computer readable instructions capable of configuring the system to perform the following method:

receiving time domain RF data corresponding to a signal to be monitored, said RF data representing said signal during a predetermined duration and over a predetermined bandwidth;

associating the received time domain RF data with a plurality of equal time intervals spanning said predetermined duration;

converting the time domain RF data associated with said equal time intervals into frequency domain data corresponding to a plurality of frequency bins;

determining at least one power characteristic for each of said frequency bins and for said signal to be monitored;

identifying frequency bins with at least one power characteristic above a noise floor;

for each of the identified frequency bins with at least one power characteristic above said noise floor, characterizing signals in the frequency bin; and locating the characterized signals using a geolocation determination algorithm.

82. The system of claim 81, further comprising receiving information for the signal to be monitored, wherein said information comprises at least one of frequency channels occupied by said signal and a spectral density function.

83. The system of claim 81, further comprising passing the time domain RF data through digital downconverters to perform I/Q detection, bandlimiting, increasing bit resolution, and reducing a sample rate of the time domain RF data.

84. The system of claim 83, wherein said digital downconverters are implemented in programmable logic in the software defined radios.

85. The system of claim 81, wherein said locating is performed using at least one of Time Difference of Arrival (TDOA) techniques, Angle of Arrival (AoA) techniques, and Power Difference of Arrival (PDOA) techniques.

86. The system of claim 81, wherein the method is implemented on a continuous basis.

87. The system of claim 81, wherein the method is implemented upon receiving an indication to initiate a signal search.

88. The system of claim 81, wherein said locating further comprises using an additive probability of a plurality of geolocation techniques to render a best location estimate.

89. The system of claim 81, further comprising determining an effective utilization of RF channels by measuring RF power versus frequency and time.

90. The system of claim 81, further comprising determining a location of an unlicensed white space transmitter and a maximum power that the white space transmitter can transmit without interfering with digital over-the-air television service.

91. The system of claim 81, wherein said network comprises a single software defined radio, further comprising moving said software defined radio to multiple locations in a serial fashion over a geographic area to be monitored.

92. The system of claim 81, further comprising synchronizing time and frequency between software defined radios.

93. The system of claim 92, wherein said synchronizing is performed using a GPS timing receiver.

94. The system of claim 92, wherein said synchronizing is performed using a plurality of signals and synchronizing techniques.

95. The system of claim 81, further comprising estimating an absolute power transmitted by a source of interference by using propagation models of a local environment.

96. The system of claim 82, wherein said information comprises a catalog of legitimate signals.

97. The system of claim 96, further comprising comparing the characterized signals with said legitimate signals to identify illegitimate signals.

98. The system of claim 81, wherein the software defined radios are calibrated in power to measure absolute power of the received time domain RF data.

99. The system of claim 81, further comprising time stamping data representing characterized signals and storing the time stamped data in a database.

100. The system of claim 95, wherein said locating comprises estimating radiated power of the source of interference by determining the source's power and determining a location as a function of characteristics of the one or more software defined radios' receive antennae and an RF propagation model.

101. The system of claim 97, further comprising generating an alert when illegitimate signals are identified.

102. The system of claim 81, further comprising determining a percentage occupancy metric over a predetermined geographic area as a function of a percentage of time during a predetermined time period that the characterized signals are transmitted.

* * * * *